UNITED STATES PATENT OFFICE 2,565,573

ALPHA,ALPHA'-AZOBIS(ALPHA-ARYLNITRILES)

Donald Cargill Pease and James A. Robertson, Wilmington, Del., assignors to E. I. du Pont de Nemours & Company, Wilmington, Del., a corporation of Delaware No Drawing. Application March 22, 1947,
Serial No. 736,594

1 Claim. (Cl. 260—192)

This invention relates to new aromatic azo compounds and their use in polymerization.

This invention has as an object the preparation of new organic compounds. A further object is the provision of a process for the polymerization of ethylenically unsaturated organic compounds. Other objects will appear hereinafter.

These objects are accomplished by the invention of tetra-substituted azo-diacetonitriles having but one aromatic radical directly attached to each alpha carbon and by the employment of these compounds as effective low temperature catalysts in the polymerization of compounds which undergo additional polymerization to macromolecular polymers and have at least one ethylenic double bond.

A suitable method for the preparation of these compounds is the reaction of a carbonyl compound containing one and only one aromatic group attached to the carbonyl carbon, e. g., acetophenone, with hydrazine, isolation of the azine compound, and treatment of the azine with anhydrous hydrogen cyanide followed by oxidation of the intermediate hydrazo compound with halogen. This method is the subject of copending application Serial Number 736,586 (now U. S. Patent 2,469,358), filed March 22, 1947, by Witty L. Alderson and James A. Robertson.

The invention is illustrated in the following examples in which parts are by weight.

Example 1

In a vessel equipped with a reflux condenser were placed 120 parts of acetophenone, 25 parts of hydrazine hydrate and 240 parts of alcohol. After refluxing for about 16 hours, the vessel and contents were cooled and the solid material collected on a filter. There was obtained 112 parts (95% of theory) of the azine compound which had a melting point of 121° C.

In a pressure resistant vessel were placed 47.2 parts of the above azine compound and 45 parts of hydrogen cyanide. The vessel was closed and heated for 4 hours at 100° C. After cooling the vessel was opened and the excess hydrogen cyanide removed by evaporation. The solid product obtained was recrystallized from alcohol and consisted of 38 parts (64% of theory) of alpha,-alpha'-hydrazobis(alpha-phenylpropionitrile) which had a melting point of 115° C.

Twenty-nine (29) parts of the above hydrazo compound, 100 parts of water and 68 parts of concentrated hydrochloric acid were mixed at a temperature of below 15° C. and cooled to —10 to —20° C. while chlorine was introduced with stirring until excess chlorine was present. The solid product, while kept at a temperature of below 10° C., was collected on a filter, washed with water and alcohol and dried at 5 mm. pressure. There was obtained 23 parts (80% of theory) of alpha,alpha'-azobis(alpha-phenylpropionitrile). The compound had a melting point of 40° C. with decomposition. It slowly evolved nitrogen at room temperature.

Example 2

One part of alpha,alpha'-azobis(alpha-phenylpropionitrile) was added to 100 parts of acrylonitrile at 5° C. The solution was kept under nitrogen at this temperature for 2½ days. The polymer which formed was separated by filtration and dried. The yield of polyacrylonitrile was 12 parts. The polymer had an intrinsic viscosity of 1.26 measured on a 0.1-g. sample in 100 ml. of dimethylformamide at 25° C. Conventional polymerization catalysts such as benzoyl peroxide do not catalyze the polymerization of acrylonitrile under such conditions.

The unexpected superiority in low temperature polymerization by tetrasubstituted azodiacetonitriles of this invention, as exemplified by alpha,alpha'-azobis(alpha-phenyl-propionitrile), is not restricted to polymerization of acrylonitrile. These catalysts may be used for the polymerization and copolymerization of compounds which undergo addition polymerization to macromolecular polymers and which have at least one ethylenic double bond. These include such ethylenically unsaturated compounds as styrene, ethylene, tetrafluoroethylene, vinyl and vinylidene halides, e. g., vinyl chloride and vinylidene chloride, vinyl esters, e. g., vinyl acetate, acrylates and methacrylates, e. g. methyl methacrylate, etc. The compounds preferably have a $CH_2=C$ group, i. e. are alpha-methylene polymerizable compounds. Temperatures from —10° to 100° C. are usually used. The optimum temperature depends on the particular polymerization system employed and on the aryl and alkyl groups attached to the carbon alpha to the azo group.

The azo compounds of this invention may be represented by the formula

where $R_1$ is an aromatic radical and $R_2$ is an alkyl radical of 1–7 carbons such as methyl, ethyl, propyl, butyl, isoamyl, and heptyl. The $R_1$ is an aryl radical, e. g. phenyl, naphthyl, etc. The aromatic radical may have alkyl substituents such as methyl, ethyl, etc.

These compounds are conveniently prepared by reacting an aromatic ketone $R_1R_2CO$, where $R_1$ and $R_2$ are as above, with hydrazine to form the azine. The azine is freed from water and unreacted hydrazine and treated with hydrogen cyanide followed by mild oxidation, e. g., as described in Example I.

In addition to the use of these azo compounds as addition polymerization catalysts they may be used for the preparation of other compounds useful for synthetic work. For example, decomposition of the azo compounds under suitable conditions produces the dinitrile $$R_1R_2C(CN)C(CN)R_1R_2$$

Furthermore, nitrile groups of the azo compound can be converted to carboxylic ester and amide groups, although such conversion should be carried out at low temperatures to avoid decomposition of the azo group. The latter azo compounds are useful as polymerization catalysts.

The foregoing detailed description has been given for clearness of understanding only and no unnecessary limitations are to be understood therefrom. The invention is not limited to the exact details shown and described for obvious modifications will occur to those skilled in the art.

What is claimed is:
Alpha,alpha' - Azobis(alpha - phenylpropionitrile).

DONALD CARGILL PEASE.
JAMES A. ROBERTSON.

REFERENCES CITED

The following references are of record in the file of this patent:

UNITED STATES PATENTS

| Number | Name | Date |
|---|---|---|
| 2,109,183 | Roose | Feb. 22, 1938 |
| 2,356,767 | Kropa | Aug. 29, 1944 |
| 2,469,358 | Alderson et al. | May 10, 1949 |
| 2,471,959 | Hunt | May 31, 1949 |

OTHER REFERENCES

Thiele et al.: Liebig's Annalen, vol. 290, pp. 1–40 (1896).

Hartman: Recueil des Travaux Chimiques, vol. 46, pp. 150–153.

Dox: J. Amer. Chem. Soc., vol. 47, pp. 1471–1476 (1925).

A. Mailke: Bull. Soc. Chim. de France (4), vol. 29, pp. 219–223 (1921).

A. Mailke: Bull. Soc. Chim. de France, vol. 27, pp. 541–547 (1920).